(12) United States Patent
Nakanishi et al.

(10) Patent No.: US 12,086,740 B2
(45) Date of Patent: Sep. 10, 2024

(54) MANAGEMENT DEVICE, MANAGEMENT METHOD, AND MANAGEMENT PROGRAM

(71) Applicant: Nippon Telegraph and Telephone Corporation, Tokyo (JP)

(72) Inventors: Koki Nakanishi, Musashino (JP); Nagatoshi Nawa, Musashino (JP); Takeshi Masuda, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 228 days.

(21) Appl. No.: 17/773,460

(22) PCT Filed: Nov. 1, 2019

(86) PCT No.: PCT/JP2019/043168
§ 371 (c)(1),
(2) Date: Apr. 29, 2022

(87) PCT Pub. No.: WO2021/084763
PCT Pub. Date: May 6, 2021

(65) Prior Publication Data
US 2022/0383215 A1    Dec. 1, 2022

(51) Int. Cl.
*G06Q 10/0631* (2023.01)
*G06F 9/451* (2018.01)
*G06Q 10/0633* (2023.01)

(52) U.S. Cl.
CPC ......... *G06Q 10/0631* (2013.01); *G06F 9/453* (2018.02); *G06Q 10/0633* (2013.01)

(58) Field of Classification Search
None
See application file for complete search history.

(56) References Cited

U.S. PATENT DOCUMENTS

2020/0193708 A1* 6/2020 Maggiore ............. H04W 4/029
2020/0273552 A1* 8/2020 Wolf ................ G06Q 10/06312

FOREIGN PATENT DOCUMENTS

| JP | H10222506 | 8/1998 |
|---|---|---|
| JP | 2002123786 | 4/2002 |
| JP | 2003016156 | 1/2003 |
| JP | 2011215838 | 10/2011 |
| JP | 2014164560 | 9/2014 |
| JP | 2015109001 | 6/2015 |
| JP | 2017146729 | 8/2017 |

OTHER PUBLICATIONS

Tenda Co., Ltd., "Manual creation software Dojo," tepss.com, available on or before Apr. 23, 2009, retrieved on Sep. 18, 2019, retrieved from URL <https://www.tepss.com/>, 7 pages (with English Translation).

* cited by examiner

*Primary Examiner* — Stephanie Z Delich
(74) *Attorney, Agent, or Firm* — Fish & Richardson P.C.

(57) ABSTRACT

A management device obtains a first operational process, which is an operational process described in an operational procedure manual for an application, and a second operational process, which is an operational process performed by a user on the application. The management device further determines whether the first operational process is consistent with the second operational process or not. If the management device determines that the first operational process is not consistent with the second operational process, the management device displays a review screen to check inconsistency between the operational processes.

7 Claims, 9 Drawing Sheets

MANAGEMENT DEVICE, MANAGEMENT METHOD, AND MANAGEMENT PROGRAM

CROSS-REFERENCE TO RELATED APPLICATIONS

This application is a National Stage application under 35 U.S.C. § 371 of International Application No. PCT/JP2019/043168, having an International Filing Date of Nov. 1, 2019, the disclosure of which is considered part of the disclosure of this application, and is incorporated in its entirety into this application.

TECHNICAL FIELD

The present invention relates to a management device, a management method and a management program.

BACKGROUND ART

Techniques for supporting operation of an application using a manual are conventionally known. For example, a tool is known which obtains captured screen images as an operation log (work trail) in order to efficiently implement utilization and creation of a manual used for a business system. For other examples, a tool that supports creation of a manual based on the operation log of an application and a technique of presenting the corresponding part of a manual on an operation screen are known.

With the use of the techniques described above, a user can leave a work trail while operating according to a manual and a manual writer can refer to the operation log and see actually performed operations in order to update the manual accordingly.

CITATION LIST

Patent Literature

Patent Literature 1: Japanese Patent Laid-Open No. 2014-164560
Patent Literature 2: Japanese Patent Laid-Open No. 2017-146729

Non-Patent Literature

Non-Patent Literature 1: Manyuaru Sakusei Sohuto "Dojo" (in Japanese) (Manual Creation Software "Dojo") [online] Available at: https://www.tepss.com/ [accessed 18 Oct. 2019]

SUMMARY OF THE INVENTION

Technical Problem

A problem with the conventional art is that a manual may not be updated efficiently. Operational processes of an application may change in response to changes in its environment. Moreover, it is contemplated that operations or operational errors, which were not expected at the time of creation of a manual, may occur. In such cases, the manual has to be updated by feeding back those issues and reflecting actually performed operations, but, in the conventional art, it is difficult to achieve efficient feedback and update of the manual.

The technique described in Patent Literature 2 enables a user to operate an application with reference to the content corresponding to a manual. Although the technique described in Patent Literature 2 works well for each individual screen, it does not when an actually performed operational process deviates from a manual as a result of a transition between screens and it does not support update of a manual. This is because even if the user started out by following the manual, partway through the operational process may conditionally branch, a user may click the back button to redo operations, a user may refer to another document or system to determine a certain input value, etc.

Thus, a user may lose track of the operations that the user has already completed and may not know to which operation the user should go back. For example, as shown in FIG. 9, a user may lose track of which screen illustrated in a manual corresponds to the currently operated screen. As a result, the user may move to another setting screen without completing the current operation or skip some settings. For example, an operation for configuring a predetermined setting may entail a task that is not shown in a manual such as referring to another system and document and checking a map on the Web. If an actual operation screen deviates from a manual as a result of a transition between screens as just described, it is difficult to achieve efficient feedback and update of the manual.

Means for Solving the Problem

In order to solve the problems mentioned above and achieve an object of the invention, a management device includes: an obtaining section configured to obtain a first operational process, which is an operational process described in an operational procedure manual for an application, and a second operational process, which is an operational process actually performed by a user on the application; a determination section configured to determine whether the first operational process is consistent with the second operational process or not; and a display control section configured to display a review screen to check inconsistency between the operational processes if the determination section determines that the first operational process is not consistent with the second operational process.

Effects of the Invention

According to the present invention, a manual can be updated efficiently.

DESCRIPTION OF EMBODIMENTS

Embodiments of a management device, a management method and a management program according to the present application will now be described. Note that the present invention is not limited to the embodiments described below.

A management device according to the present embodiment manages a manual for an application. As used herein, the term "application" refers to a program that is executed by a computer and performs predetermined processes in response to operations by a user.

For example, the application may display information and screens including various objects for accepting input, etc. and search for and register predetermined data in response to input, etc. to the screens by a user. The application may make a transition from one display screen to another automatically or in response to operations by a user.

The management device may execute internal processes of the application, output data for a user, and accept operations by a user. Alternatively, the management device may output data for the user and accept operations by a user, and another device, which can exchange data with the management device, may execute the internal processes.

The manual is a document that describes procedures to operate the application. The manual includes operation sheets. The operation sheets provide for specific operational processes in compliance with rules, for example, for the order of transition between screens displayed by the application and for input values.

The application may be used for corporate affairs. In that case, the manual is created in accordance with the affairs. In a case where the environment changes, or affairs or operational errors, which were not expected at the time of creation of the manual, occur, the manual has to be updated. An object of the management device according to the present embodiment is to automate at least a part of the process of updating a manual.

Configuration of First Embodiment

Figure 1:
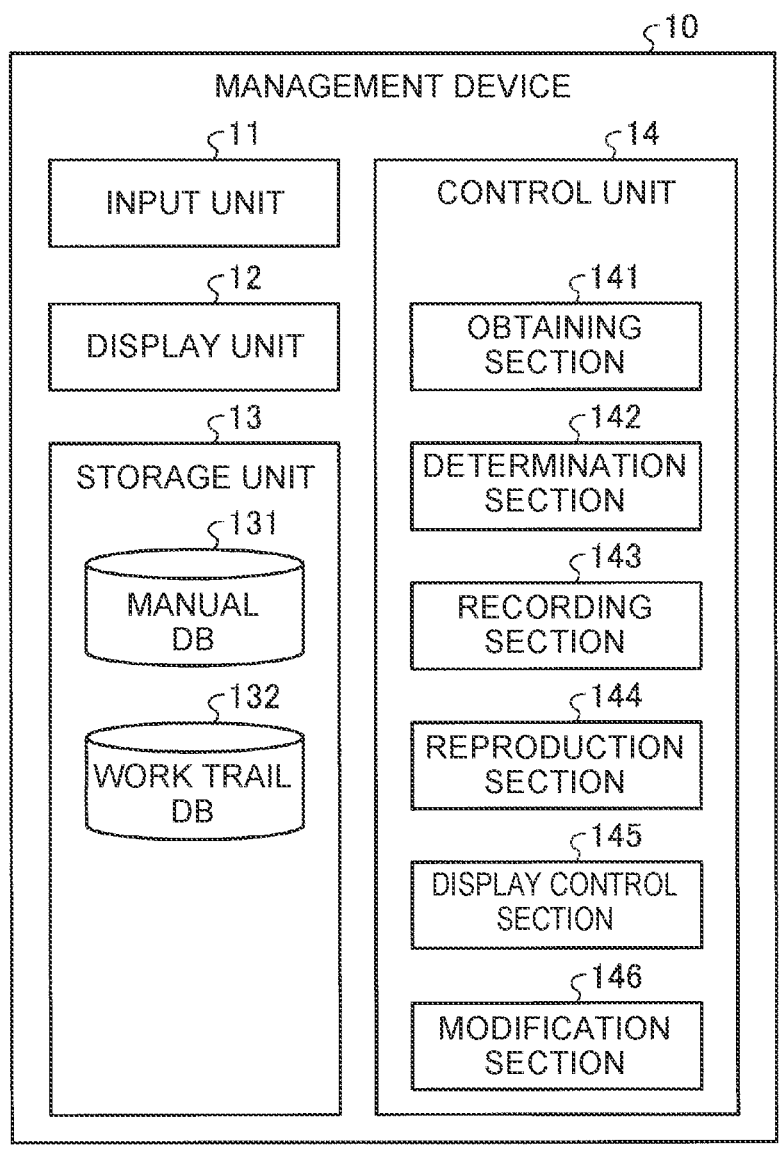
FIG. 1 is a diagram illustrating an exemplary configuration of the management device according to a first embodiment.

First, a management device according to a first embodiment is described with reference to FIG. 1. FIG. 1 is a diagram illustrating an exemplary configuration of the management device according to the first embodiment. As shown in FIG. 1, the management device 10 includes an input unit 11, a display unit 12, a storage unit 13 and a control unit 14.

The input unit 11 accepts data input by a user. For example, the input unit 11 is an input device such as a mouse and a keyboard. The display unit 12 outputs data by displaying it on the screen. For example, the display unit 12 is a display device such as a display.

The storage unit 13 is a storage device such as a hard disk drive (HDD), a solid state drive (SSD) and an optical disk. Alternatively, the storage unit 13 may be a data-rewritable semiconductor memory such as a random access memory (RAM), a flash memory and a non-volatile static random access memory (NVSRAM). The storage unit 13 stores an operating system (OS) and various programs executed by the management device 10. The storage unit 13 also includes a manual DB 131 and a work trail DB 132.

The manual DB 131 stores a manual for an application. The manual is a file in a predetermined format such as a document file, a text file and an image file. As described above, the manual specifies rules for the order of transition between screens displayed by the application and for input values. Operation sheets for respective screens included in the manual contain captured images of the respective screens.

The work trail DB 132 stores operational processes performed by the user. For example, the work trail DB 132 stores information identifying the application, information identifying respective screens displayed during execution of the application, the order of transition between the screens, input values, pressed buttons and the dates and times of executing operations. Kinds of information stored in the work trail DB 132 may be the same as those specified in the operation sheets included in the manual.

The control unit 14 has overall control of the management device 10. For example, the control unit 14 is an electronic circuit such as a central processing unit (CPU) and a micro processing unit (MPU) or an integrated circuit such as an application specific integrated circuit (ASIC) and a field programmable gate array (FPGA). The control unit 14 has an internal memory for storing programs and control data specifying various process procedures and uses the internal memory to execute processes. The control unit 14 functions as different kinds of processing units by executing different kinds of programs. For example, the control unit 14 includes an obtaining section 141, a determination section 142, a recording section 143, a reproduction section 144 and a display control section 145.

The obtaining section 141 obtains a first operational process, which is an operational process described in an operational procedure manual for the application, and a second operational process, which is an operational process performed by the user on the application.

The obtaining section 141 can obtain the first operational process by referring to the manual DB 131. The obtaining section 141 can obtain the second operational process by referring to an operation screen log. The operation screen log here is a log of operations on screens collected by the OS or application, etc. The first operational process can represent an operational process described in the manual. The second operational process can represent an operational process actually performed by the user.

The determination section 142 determines whether the first operational process is consistent with the second operational process or not. In particular, the determination section 142 determines whether the order of transition between screens by the first operational process is consistent with the order of transition between the screens by the second operational process or not and whether both the first operational process and the second operational process include the same predetermined operations or not.

Figure 2:
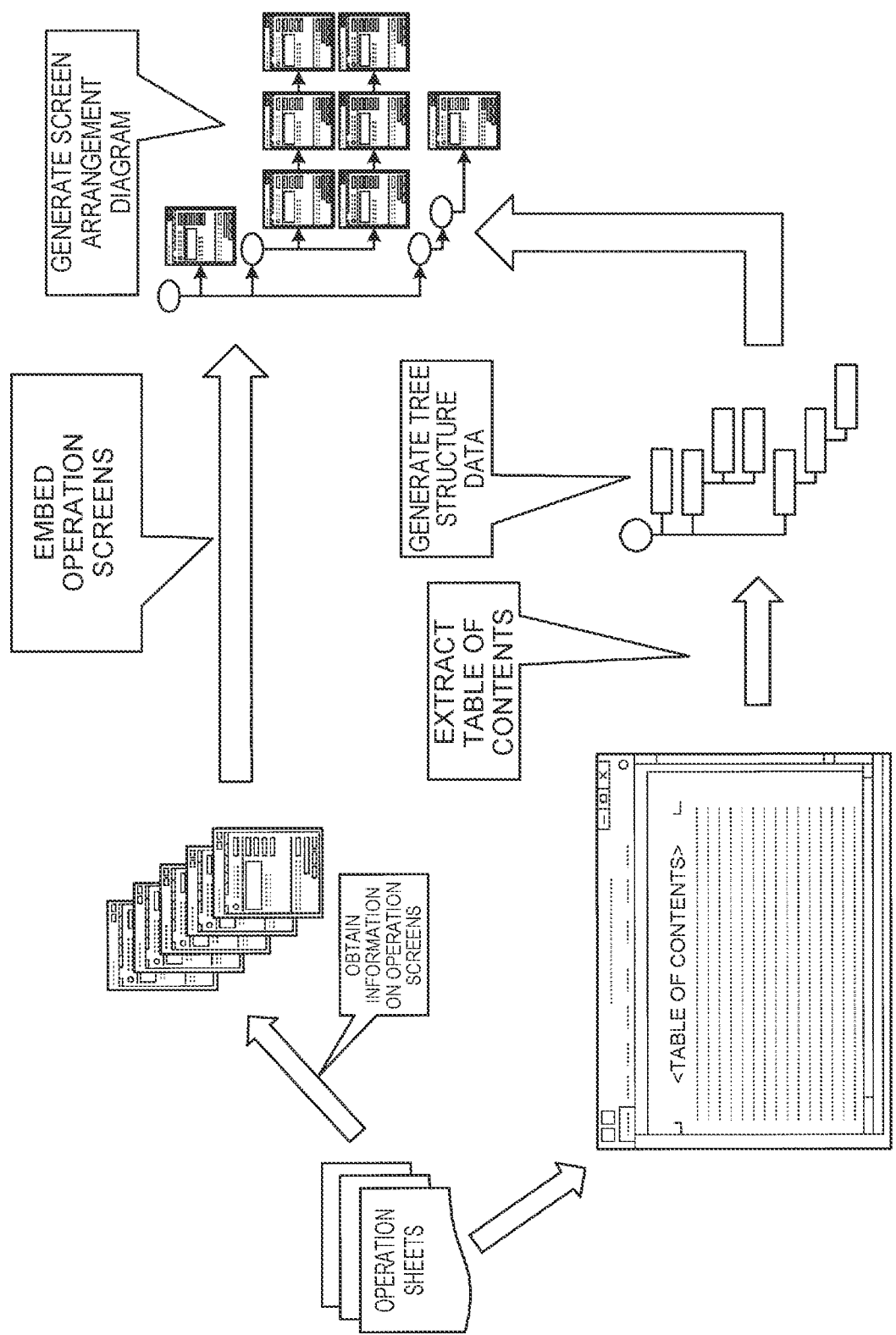
FIG. 2 is a diagram for describing how to obtain screens from a manual to be compared.

For example, the determination section 142 may perform the determination by comparing the manual and the actually performed operations based on tree structure data obtained by the obtaining section 141. FIG. 2 is a diagram for describing how to obtain screens from the manual to be compared with the operation screen log. As shown in the lower part of FIG. 2, the obtaining section 141 generates tree structure data representing a relationship between groups determined by dividing operation screens in predetermined units based on the table of contents extracted from the manual. The predetermined units may be chapters, sections and subsections. In this case, the obtaining section 141 can create the tree structure data by sequencing the groups in the order of their appearance in the table of contents or their page number in the section. The obtaining section 141 provide each node of the tree structure with its corresponding page number as attribute information.

Then, the obtaining section 141 obtains, as the first operational process, data created by associating images of the operation screens shown in the manual with the tree structure data. The obtaining section 141 compares the page number of a page on which each image is placed with page numbers that are attribute information of the tree structure data, and can embed the image in the matched node. The tree structure data in which the images are embedded by the obtaining section 141 is hereinafter referred to as a screen transition diagram.

The determination section 142 determines a part where the operational process performed by the user deviates from the operational process described in the manual by comparing the tree structure data for the operation screens obtained from the manual with tree structure data for the operation screens obtained from the operations actually performed by the user. In this way, the determination section 142 determines whether the first operational process is consistent with the second operational process or not. For example, if a node included in one of these tree structure data does not exists at the corresponding position in the other tree structure data, the determination section 142 can determine that the node is a part where the operational processes deviate from each other and determine that the first operational process is not consistent with the second operational process.

If the determination section 142 determines that the first operational process is not consistent with the second operational process, the management device 10 can provide a notification to the user 20 operating the application and provide feedback to the manual DB 131. For example, the feedback is reflected by modifying the manual.

The obtaining section 141 extracts operation information by referring to the table of contents of the manual in which work progress is indicated. The obtaining section 141 obtains screen transitions described in the operation sheets and screen transitions recorded in the actual operation log in synchronization with operations by the user 20. The determination section 142 compares the operational processes to determine whether all the required operations were performed and whether the orders of operations in the operational processes are consistent with each other. Because the second operational process is recorded in the work trail DB 132, the appropriateness of the second operational process can be checked later.

Figure 3:
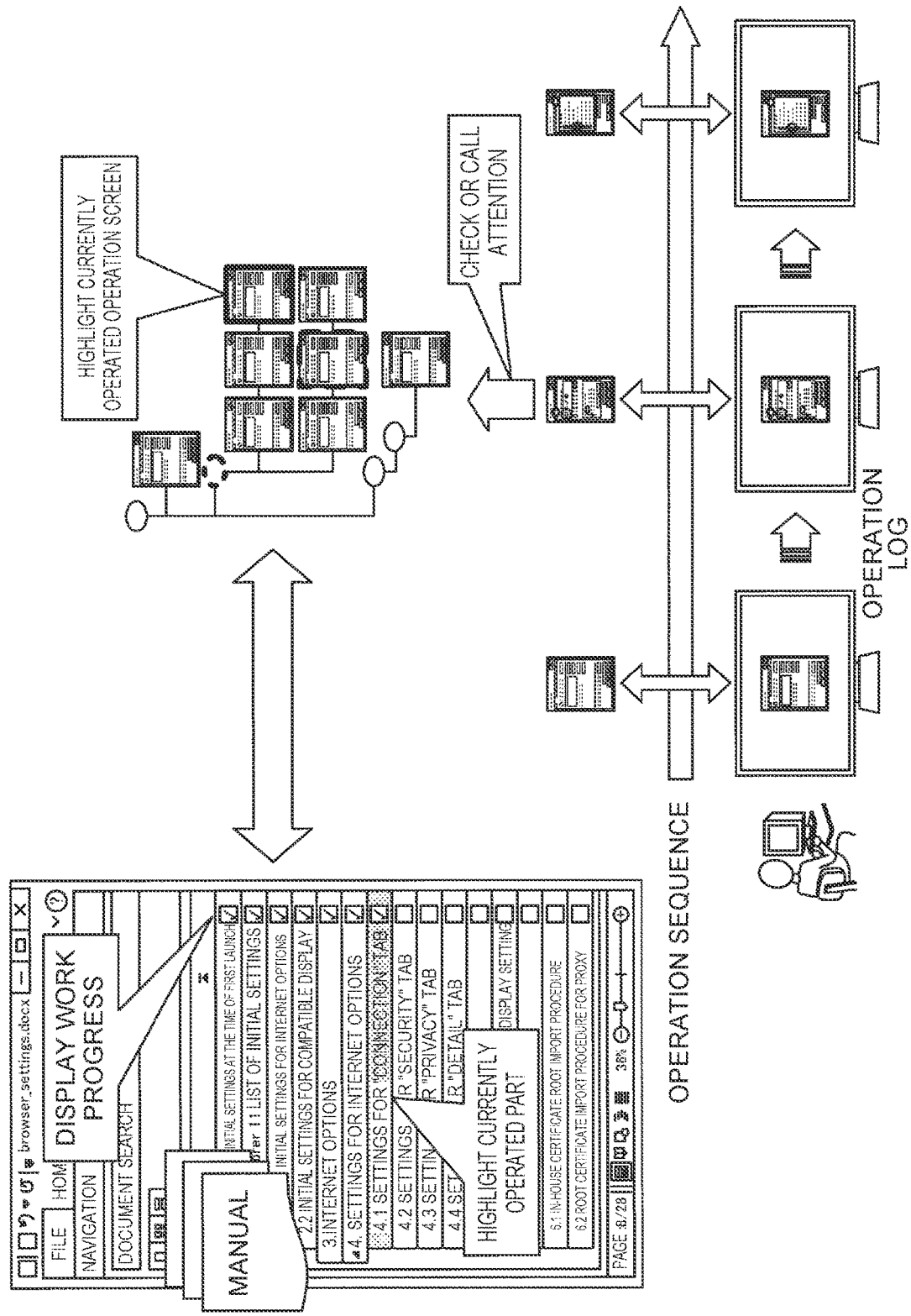
FIG. 3 is a diagram illustrating how to determine whether the operation log is consistent with the manual or not.

With reference to FIG. 3, a description is now provided of how to make a determination using the screen transition diagram. FIG. 3 is a diagram illustrating how to determine whether the operation log is consistent with the manual or not. The display control section 145 displays screens via the display unit 12. As shown in FIG. 3, the display control section 145 displays the screen transition diagram. In the screen transition diagram, the display control section 145 highlights a position (node) of the operation screen corresponding to the operation screen that is being operated by the user. This enables the user to see to which part of the manual the operation screen being operated by the user corresponds.

The display control section 145 also displays the table of contents of the manual and checkboxes for respective sections in the table of contents. When an operation completes, the user can tick the corresponding checkbox. The display control section 145 may determine which operation screen is being operated by the user based on which checkboxes are already ticked. In this way, the display control section 145 can display the completed part of the manual based on the result of comparison of the tree structure data by the determination section 142.

If the displayed table of contents of the manual has no section corresponding to an operation screen for which operations have been already completed, the user can input information on that issue in a predetermined manner to the management device 10 to call attention to it. For example, the user fills out a predetermined message form to call attention to the issue. If the user calls attention to the issue, the determination section 142 can determine that the first operational process is not consistent with the second operational process.

The user may manually add the operation screen, for which the user calls attention, to the manual. Then, the display control section 145 accepts an operation to add the operation screen to the currently displayed screen transition diagram. After the user adds the operation screen to the screen transition diagram, a modification section 146 updates the manual DB 131 to add the screen to the manual.

The recording section 143 records the second operational process in the work trail DB 132. Thus, the appropriateness of the second operational process can be checked later. The user 20 may add a comment on the second operational process. In that case, the recording section 143 records the second operational process together with the comment. The recording section 143 may capture images of screens of the application using a capture tool, etc. and record the captured images in the work trail DB 132.

The reproduction section 144 reproduces a first screen of the application in which operations were performed based on the first operational process and a second screen of the application in which operations were performed based on the second operational process. For example, the reproduction section 144 reproduces the screens after the operations by obtaining information identifying the screens and input values for respective fields in the screens from the manual DB 131 or the work trail DB and setting the obtained values to objects such as text boxes.

Figure 4:
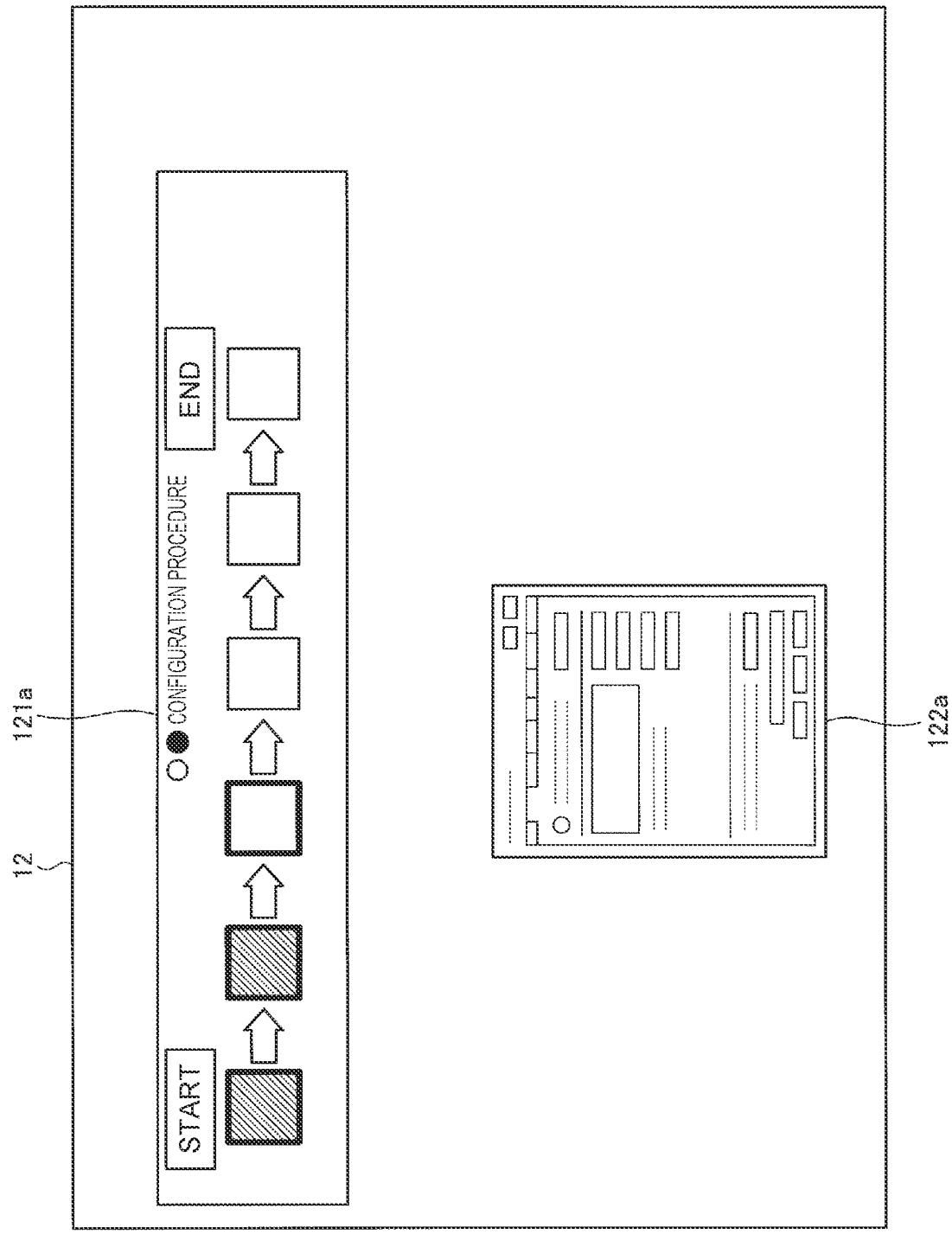
FIG. 4 is a diagram illustrating an exemplary screen transition display screen.

The display control section 145 may display the manual in the form illustrated in FIG. 4. That is, as shown in FIG. 4, the display control section 145 displays both a screen of the application and the manual on the desktop. The display control section 145 displays operation sheets of the manual corresponding to screens of the application manually or automatically as transitions are made between the screens. FIG. 4 is a diagram illustrating an exemplary screen transition display screen. As shown in FIG. 4, the display control section 145 can display an execution screen 122a of the application in conjunction with a screen transition diagram 121a in the manual.

Figure 5:
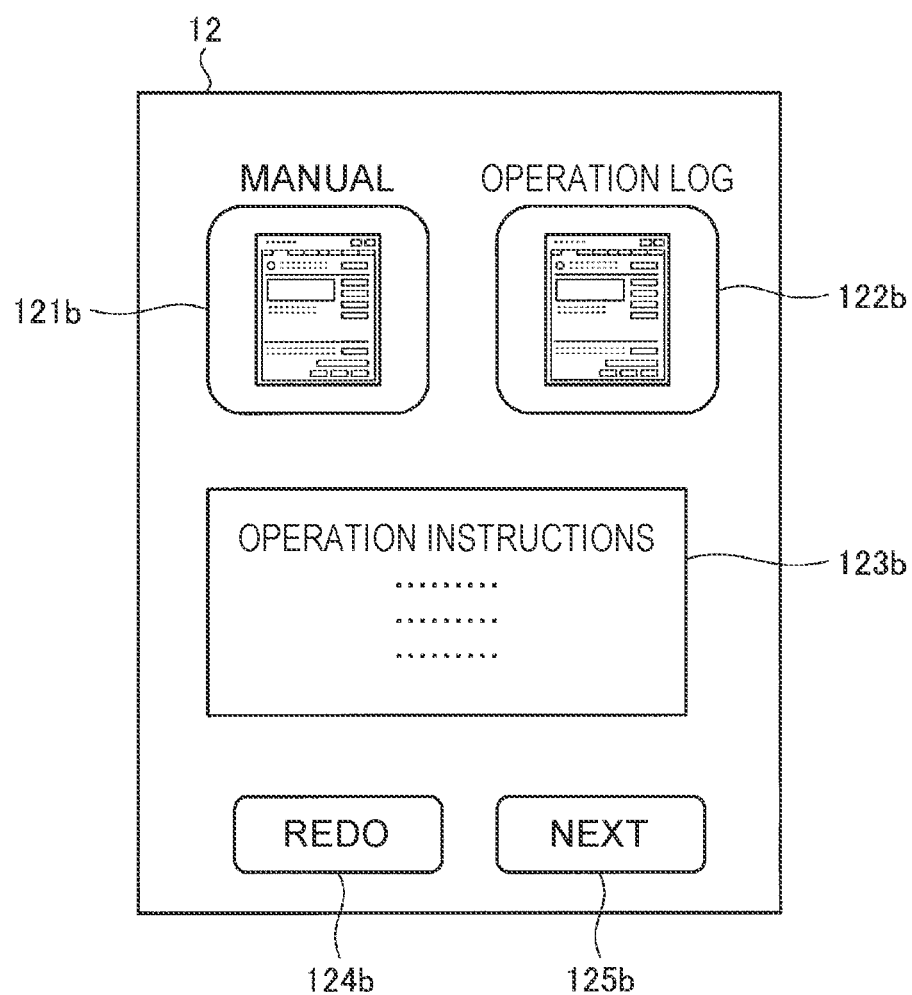
FIG. 5 is a diagram illustrating an exemplary review screen.

If the determination section 142 determines that the first operational process is not consistent with the second operational process, the display control section 145 displays a review screen to check inconsistency between the operational processes. FIG. 5 is a diagram illustrating an exemplary review screen. As shown in FIG. 5, the display control section 145 displays a first screen 121b and a second screen 122b reproduced by the reproduction section 144 side by side in the review screen. The first screen 121b is a screen reproduced by the reproduction section 144 based on the manual. The second screen 122b is a screen reproduced by the reproduction section 144 based on operations performed by the user 20. For example, the first screen 121b and the second screen 122b may include the same form but receive different input values.

The user 20 refers to the review screen to check consistency between the operational process performed by the user 20 and the operational process described in the manual. If the operational processes are not consistent with each other, the user 20 can check whether the difference is as intended by the user 20.

The display control section 145 also displays operation instructions 123b in the review screen. The operation instructions 123b may be stored in the manual DB 131 together with the operation sheets. The display control section 145 displays a button 124*b* and a button 125*b* in the review screen. The button 124*b* has a label "Redo." The button 125*b* has a label "Next." In this way, the management device 10 can notify the user 20 that operations were performed differently from the operational process described in the manual.

If the button 124*b* is pressed, the application redisplays the screen where the operations were performed. The user 20 can redo the operations on the redisplayed screen. Then, the recording section 143 may record the second operational process in the work trail DB 132.

If the button 125*b* is pressed, the application displays the next screen. The display control section 145 can display a comment input screen. The display control section 145 displays a comment input screen having a comment input field if the user performs an operation on the review screen to indicate that the user will not redo the operations of the second operational process. That is, if the button 125*b* is pressed, the management device 10 determines that the user 20 allowed the operational process despite the fact that the operational process is different from that described in the manual. With the use of the comment input screen, the user 20 can leave a comment to record the reason why the user 20 allowed the operational process.

Figure 6:
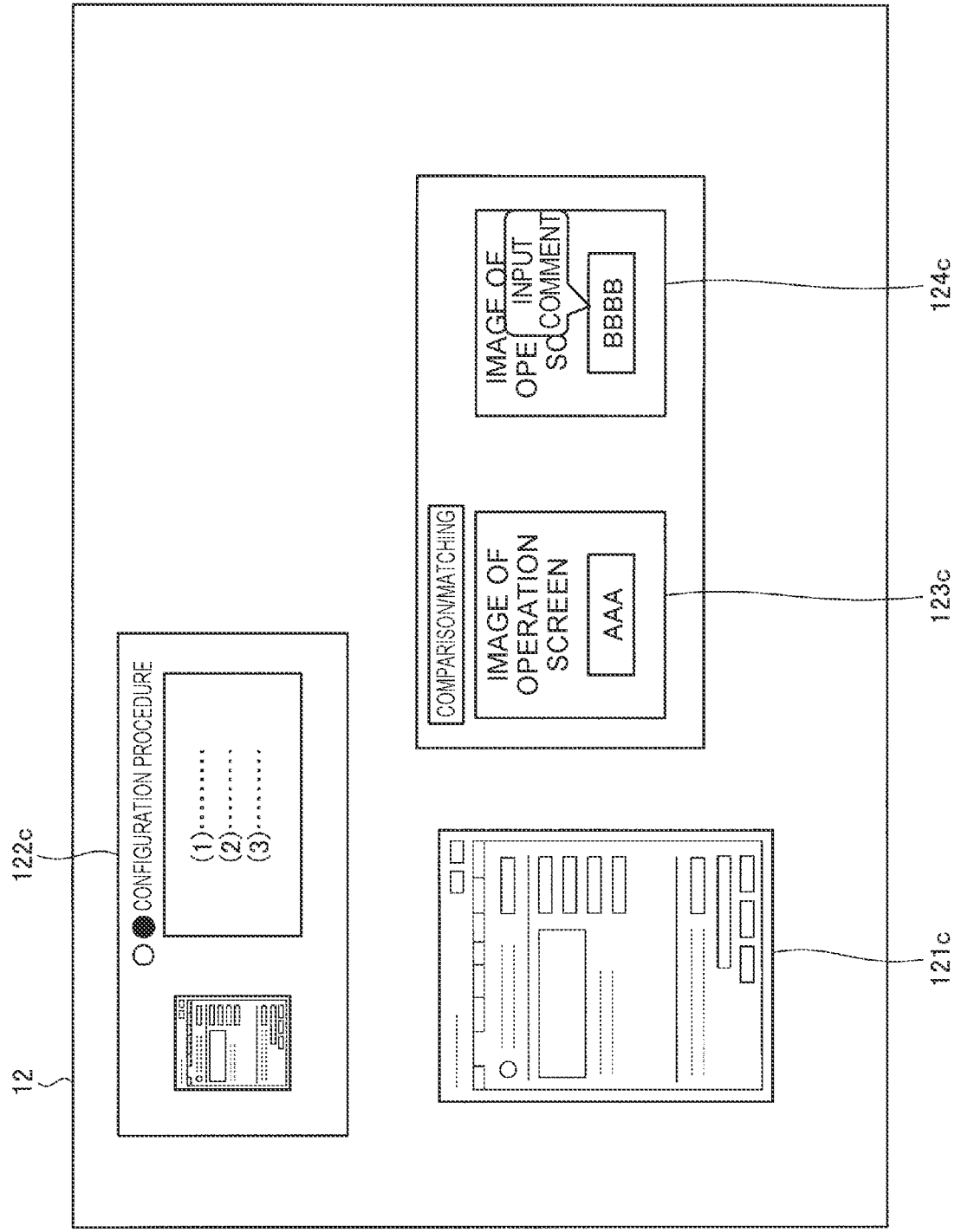
FIG. 6 is a diagram illustrating an exemplary comment input screen.

FIG. 6 is a diagram illustrating an exemplary comment input screen. As shown in FIG. 6, in the comment input screen, the display control section 145 displays an execution screen 121*c* of the application, an operation sheet 122*c* of the application, a first screen 123*c* and a second screen 124*c* similar to those in the review screen. In addition, the display control section 145 displays a comment input field on the second screen 124*c*.

The user 20 can input any comment in the comment input field on the second screen 124*c*. The recording section 143 records the second operational process in the storage unit together with the comment input to the input field.

The recording section 143 associates the second operational process with the corresponding first operational process in the manual by means of a link. For example, the recording section 143 records the second operational process in the work trail DB 132 together with information identifying the corresponding operation sheet in the manual.

If the button 125*b* is pressed on the review screen, the recording section 143 records the second operational process inconsistent with the first operational process in the work trail DB 132. The modification section 146 reflects such a second operational process on the manual. In particular, if the determination section 142 determines that the first operational process is not consistent with the second operational process, the modification section 146 modifies the first operational process described in the manual in conformance with the second operational process.

If the recording section 143 creates a link between the second operational process and the corresponding operation sheet in the manual, the modification section 146 can identify the operation sheet in the manual by following the link and modify a part where the second operational process deviates from the identified operation sheet.

Process of First Embodiment

Figure 7:
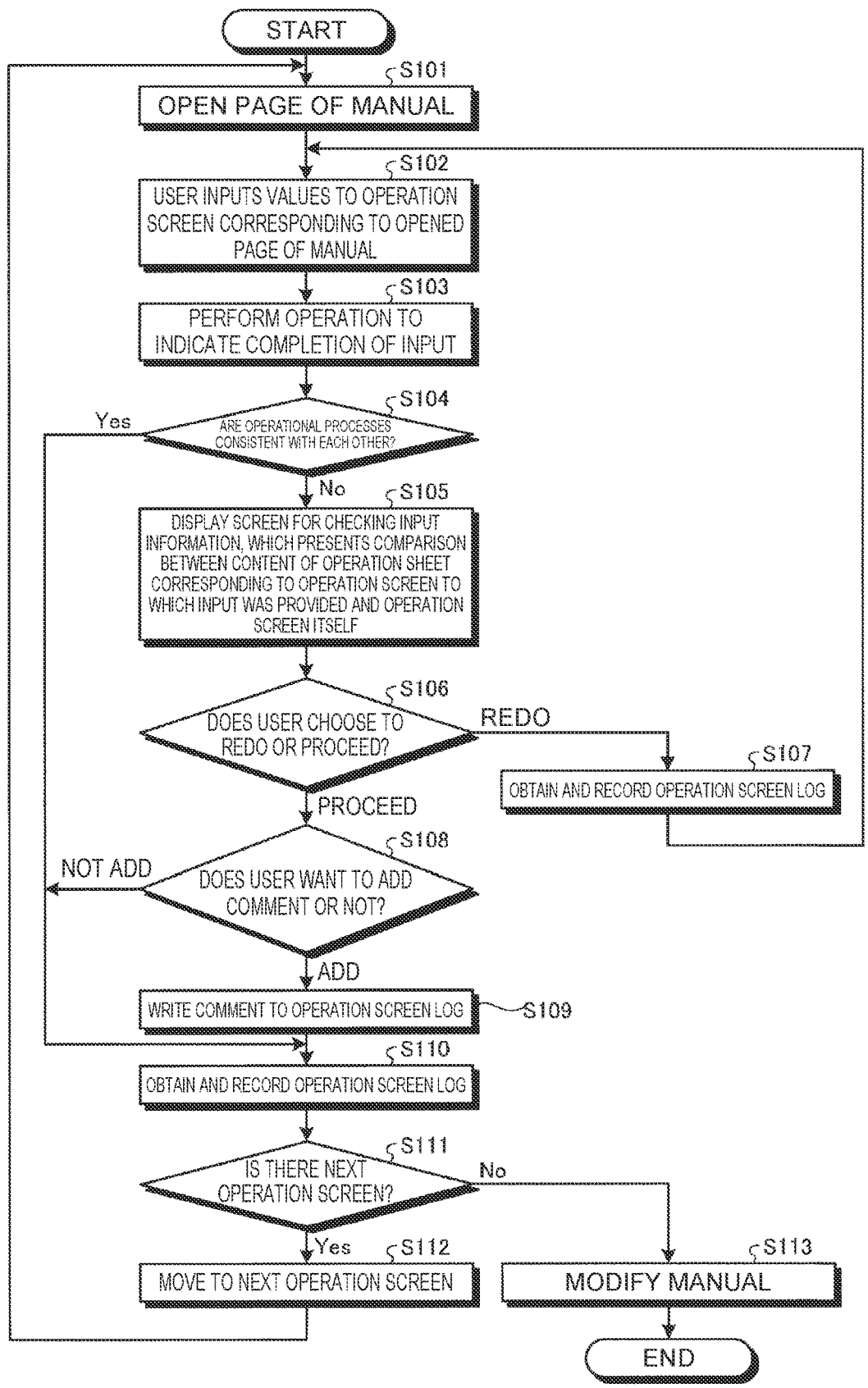
FIG. 7 is a flowchart illustrating a process flow of the management device according to the first embodiment.

FIG. 7 is a flowchart illustrating a process flow of the management device according to the first embodiment. A user 20 executes an application on the management device 10. The management device 10 can display an execution screen and a page of the manual of the application on its desktop. Each page of the manual represents the operation sheet corresponding to each screen of the application.

First, the user 20 opens a page of the manual (Step S101). The user 20 inputs values to the operation screen corresponding to the opened page of the manual (Step S102). The user 20 performs an operation to indicate the completion of input (Step S103). The operation to indicate the completion of input may be clicking a confirmation button in the manual or ticking a checkbox as described in FIG. 3. The operation screen here is a screen of the application.

The management device 10 determines whether an operational process described in the manual is consistent with an operational process actually performed by the user 20 (Step S104) in response to a click on the confirmation button. If the operational processes are consistent with each other ("Yes" in Step S104), the management device 10 obtains and records an operation screen log (Step S110). If the operational processes are not consistent with each other ("No" in Step S104), the management device 10 displays a review screen. That is, the management device 10 displays a screen for checking the input information, which presents a comparison between the content of the operation sheet corresponding to the operation screen to which the input was provided and the operation screen itself (Step S105).

The user 20 chooses whether to redo the operation or proceed via the review screen (Step S106). If the user 20 chooses to redo the operation (Redo in Step S106), the management device 10 obtains and records the operation screen log (Step S107) and returns to Step S102.

Otherwise, if the user 20 chooses to proceed the operation (Proceed in Step S106), the management device 10 asks the user 20 whether the user 20 wants to add a comment or not. The management device 10 may display a comment input screen if the user 20 presses a predetermined button, etc. or the management device 10 may determine that the user 20 wants to add a comment if the user 20 input the comment in a comment input field.

If the user 20 does not add a comment (Not add in Step S108), the management device 10 moves to Step S110. Otherwise, if the user 20 adds a comment (Add in Step S108), the management device 10 writes the comment to the operation screen log (Step S109) and then obtains and records the operation screen log (Step S110). In this way, the management device 10 can record the operational process together with the comment.

If there is the next operation screen of the application (Yes in Step S111), the management device 10 moves to the next operation screen (Step S112) and returns to Step S101 to repeat the process. Otherwise, if there is the next operation screen of the application (No in Step S111), the management device 10 modifies the manual in conformance with the operational process performed by the user 20 (Step S113).

Effects of First Embodiment

As previously described, the obtaining section 141 obtains the first operational process, which is an operational process described in the operational procedure manual for the application, and the second operational process, which is an operational process performed by the user on the application. The determination section 142 determines whether the first operational process is consistent with the second operational process or not. If the determination section 142 determines that the first operational process is not consistent with the second operational process, the display control section 145 displays a review screen to check inconsistency between the operational processes. Thus, the management device 10 can automatically determine whether the manual has to be updated or not and prompt a check by the user. The manual can, therefore, be updated efficiently by the management device 10.

The obtaining section 141 generates tree structure data representing a relationship between groups determined by dividing operation screens in predetermined units based on the table of contents of the manual, and obtains, as the first operational process, data created by associating images of the operation screens shown in the manual with the tree structure data. This makes it possible to determine a part where operations actually performed by the user deviates from the manual by comparing the tree structure data generated from the manual with tree structure data generated from the operations actually performed by the user. The manual can, therefore, be updated efficiently by the management device 10.

The determination section 142 determines a part where the operational process performed by the user deviates from the operational process described in the manual by comparing the tree structure data for the operation screens obtained from the manual with the tree structure data for the operation screens obtained from the operations actually performed by the user. By doing so, the determination section 142 determines whether the first operational process is consistent with the second operational process or not. For example, the management device 10 can determine a part where operations performed by the user deviates from the manual by comparing those tree structure data to find differences between them. The manual can, therefore, be updated efficiently by the management device 10.

The display control section 145 displays the completed part of the manual based on the result of comparison of the tree structure data by the determination section 142. This enables the user to intuitively understand current work progress relative to the manual.

The display control section 145 can display a comment input screen having a comment input field if the user performs an operation on the review screen to indicate that the user will not redo the operations of the second operational process. Then, the recording section 143 records the second operational process in the storage unit together with the comment input to the input field. Accordingly, the management device 10 can record a comment by the user in a case where the user recognizes that he changed the operational procedure. This improves the efficiency of update of a manual and review for the update.

The reproduction section 144 can reproduce a first screen of the application in which operations were performed based on the first operational process and a second screen of the application in which operations were performed based on the second operational process. Then, the display control section 145 displays the first screen and the second screen reproduced by the reproduction section 144 side by side in the review screen. Accordingly, the user can intuitively understand differences between the operational process described in the manual and the actually performed operational process.

If the determination section 142 determines that the first operational process is not consistent with the second operational process, the modification section 146 can modify the first operational process described in the manual in conformance with the second operational process. In this way, the management device 10 can perform even modification of the manual automatically and thus achieve further efficiency.

[System Configuration]

The components of the devices illustrated in the drawings are merely illustrative of conceptual functions and do not need to be physically arranged as shown in the drawings. That is, specific implementation of distribution and integration of the devices is not limited to that shown in the drawings, and all or some of the devices can be distributed or integrated functionally or physically in any units depending on the load on or usage of them. The processing function of each device may be implemented fully or partially by a CPU or a program executed by the CPU, or may be implemented in wired logic hardware.

All or some of the processes described as being executed automatically in the embodiment may be executed manually, and all or some of the processes described as being executed manually in the embodiment may be executed automatically by a publicly known method. Moreover, unless specifically stated otherwise, the process procedures, control procedures, specific names, and information including various data and parameters described in this specification or the drawings can be arbitrarily changed.

Program

In an embodiment, the management device 10 can be implemented by installing on desired computer a management program that performs the management processes described above in the form of a package software or an online software. For example, an information processing device can function as the management device 10 by executing the management program. Examples of the information processing device include a desktop or notebook personal computer. Other examples of the information processing device include a smartphone, a mobile communication terminal such as a mobile phone and a personal handyphone system (PHS), and a slate terminal such as a personal digital assistant (PDA).

The management device 10 may be implemented as a management server device that provides services for the management processes described above to a client that is a terminal device used by a user. For example, the management server device is implemented as a server device that provides a management service including accepting graph data as input and outputting results of graph signal processing or analysis of the graph data. In this case, the management server device may be implemented as a web server, or may be implemented as a cloud that provides services for the above-mentioned management processes by outsourcing.

Figure 8:
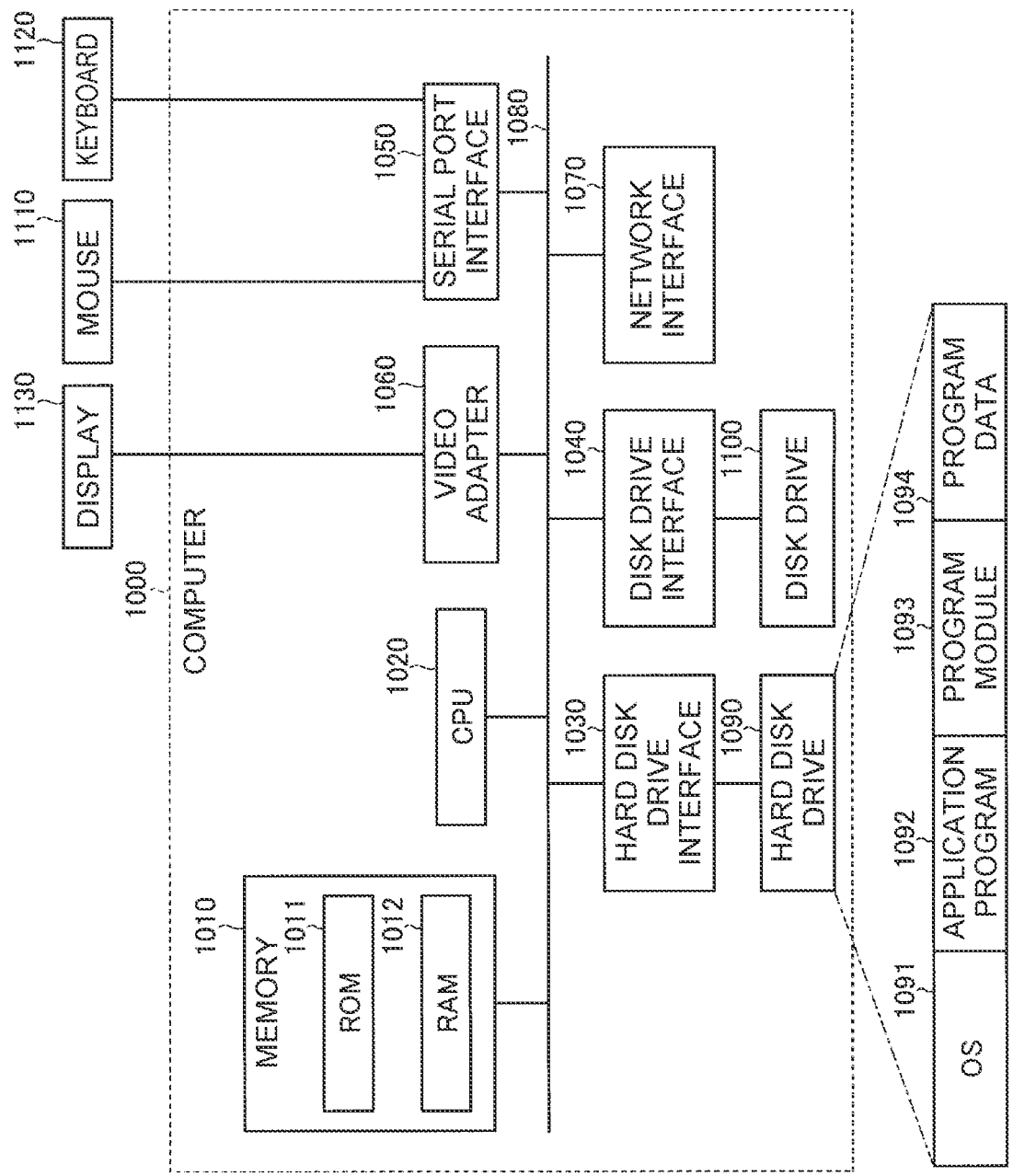
FIG. 8 is a diagram illustrating an exemplary computer that executes a management program.
Figure 9:
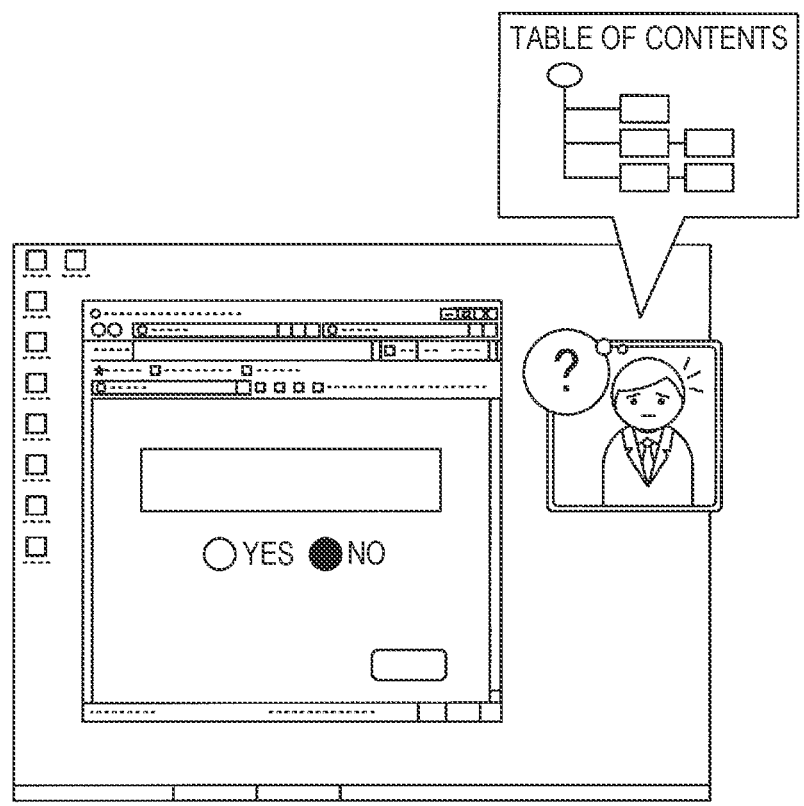
FIG. 9 is a diagram illustrating the conventional art.

FIG. 8 is a diagram illustrating an exemplary computer that executes the management program. For example, the computer 1000 includes a memory 1010 and CPU 1020. The computer 1000 also includes a hard disk drive interface 1030, a disk drive interface 1040, a serial port interface 1050, a video adapter 1060 and a network interface 1070. These components are connected via a bus 1080.

The memory 1010 includes read only memory (ROM) 1011 and a RAM 1012. The ROM 1011 may store a boot program such as a basic input output system (BIOS). The hard disk drive interface 1030 is connected with a hard disk drive 1090. The disk drive interface 1040 is connected with a disk drive 1100. A removable storage medium such as a magnetic disk and an optical disk may be inserted into the disk drive 1100. The serial port interface 1050 may be connected to a mouse 1110 and a keyboard 1120. The video adapter 1060 may be connected with a display 1130.

The hard disk drive 1090 may store an OS 1091, an application program 1092, a program module 1093 and program data 1094. That is, a program specifying processes for the management device 10 is implemented as the program module 1093 including codes executable by the computer. The program module 1093 may be stored in the hard disk drive 1090. A program module 1093 for performing processes equivalent to those performed by the functional components of the management device 10 may be stored in the hard disk drive 1090. The hard disk drive 1090 may be replaced by an SSD.

Setting data used in the processes of the embodiment described above may be stored in the memory 1010 and the hard disk drive 1090 as the program data 1094. The CPU 1020 reads the program module 1093 and the program data 1094 stored in the memory 1010 and the hard disk drive 1090 into the RAM 1012 as required and executes the processes of the embodiment described above.

The program module 1093 and the program data 1094 do not need to be stored in the hard disk drive 1090 but may be stored in a removable storage medium and read by the CPU 1020 via the disk drive 1100, etc. Alternatively, the program module 1093 and the program data 1094 may be stored in another computer connected via a network (such as a local area network (LAN) and a wide area network (WAN)). Then, the program module 1093 and the program data 1094 may be read by the CPU 1020 from the other computer via the network interface 1070.

REFERENCE SIGNS LIST

10 Management device
11 Input unit
12 Display unit
13 Storage unit
14 Control unit
131 Manual DB
132 Work trail DB
141 Obtaining section
142 Determination section
143 Recording section
144 Reproduction section
145 Display control section
146 Modification section

The invention claimed is:

1. A management device comprising a memory and a processor configured to:
   obtain, as a first operational process, first tree structure data comprising predetermined operation screens described in an operational procedure manual for an application;
   obtain, as a second operational process, second tree structure data comprising operation screens obtained from operations performed by a user on the application;
   determine whether the first operational process is consistent with the second operational process or not, wherein the determination comprises:
     (i) determining whether operation screens in the first operational process match the operation screens in the second operational process; and
     (ii) determining whether an order of transition between screens in the first operational process is consistent with the order of transition between screens in the second operational process;
   in response to determining that the first operational process is not consistent with the second operational process, determine a part where the operations performed by the user deviate from the manual;
   display a review screen for the part of deviation, the review screen comprising: (i) a first screen reproduced based on the manual, (ii) a second screen reproduced based on operations preformed by the user, (iii) operation instructions obtained from the manual, and (iv) a button to proceed;
   receive an interaction from the user indicating that the button to proceed is pressed;
   display a comment input screen including an input field for the user to input a comment indicating reasons for proceeding despite the deviation;
   receive the comment input by the user in the input field; and
   record the second operational process together with the input comment in a storage device.

2. The management device according to claim 1, wherein the management device is further configured to generate tree structure data representing a relationship between groups determined by dividing operation screens in predetermined units based on a table of contents of the manual, and obtain, as the first operational process, data created by associating images of the operation screens shown in the manual with the tree structure data.

3. The management device according to claim 1, wherein the management device is further configured to display work progress by displaying a completed part of the manual based on a result of comparison between the tree structure data.

4. The management device according to claim 1, wherein the management device is further configured to display the first screen and the second screen reproduced side by side in the review screen.

5. The management device according to claim 1, wherein the management device is further configured to modify the first operational process described in the manual in conformance with the second operational process in response to determining that the first operational process is not consistent with the second operational process.

6. A management method that is executed by a computer, comprising:
   obtaining, as a first operational process, first tree structure data comprising predetermined operation screens described in an operational procedure manual for an application;
   obtaining, as a second operational process, second tree structure data comprising operation screens obtained from operations performed by a user on the application;
   determining, wherein the determination comprises:
     (i) determining whether operation screens in the first operational process match the operation screens in the second operational process; and
     (ii) determining whether an order of transition between screens in the first operational process is consistent with the order of transition between screens in the second operational process;
   in response to determining that the first operational process is not consistent with the second operational process, determine a part where the operations performed by the user deviate from the manual;
   displaying a review screen for the part of deviation, the review screen comprising: (i) a first screen reproduced based on the manual, (ii) a second screen reproduced based on operations preformed by the user, (iii) operation instructions obtained from the manual, and (iv) a button to proceed;
   receiving an interaction from the user indicating that the button to proceed is pressed;

displaying a comment input screen including an input field for the user to input a comment indicating reasons for proceeding despite the deviation;

receiving the comment input by the user in the input field; and recording the second operational process together with the input comment in a storage device.

7. A non-transitory, computer-readable medium storing a management program for causing a computer to function as a management device, the management program being configured to cause the computer to:

obtain, as a first operational process, first tree structure data comprising predetermined operation screens described in an operational procedure manual for an application;

obtain, as a second operational process, second tree structure data comprising operation screens obtained from operations performed by a user on the application;

determine whether the first operational process is consistent with the second operational process or not, wherein the determination comprises:

(i) determining whether operation screens in the first operational process match the operation screens in the second operational process; and (ii) determining whether an order of transition between screens in the first operational process is consistent with the order of transition between screens in the second operational process;

in response to determining that the first operational process is not consistent with the second operational process, determine a part where the operations performed by the user deviate from the manual;

display a review screen for the part of deviation, the review screen comprising: (i) a first screen reproduced based on the manual, (ii) a second screen reproduced based on operations preformed by the user, (iii) operation instructions obtained from the manual, and (iv) a button to proceed;

receive an interaction from the user indicating that the button to proceed is pressed;

display a comment input screen including an input field for the user to input a comment indicating reasons for proceeding despite the deviation;

receive the comment input by the user in the input field; and record the second operational process together with the input comment in a storage device.

* * * * *